US007594174B2

(12) United States Patent
Truelove et al.

(10) Patent No.: US 7,594,174 B2
(45) Date of Patent: *Sep. 22, 2009

(54) LIVE PREVIEW AND SELECTION OF FONT AND COLOR SETS

(75) Inventors: Benjamin N. Truelove, Seattle, WA (US); Douglas A. Ricard, Bellevue, WA (US); Wai On Lee, Kirkland, WA (US); Christopher D. Williams, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 337 days.

This patent is subject to a terminal disclaimer.

(21) Appl. No.: 10/913,092

(22) Filed: Aug. 5, 2004

(65) Prior Publication Data

US 2005/0010869 A1 Jan. 13, 2005

Related U.S. Application Data

(63) Continuation of application No. 09/726,956, filed on Nov. 30, 2000, now Pat. No. 6,892,348, which is a continuation-in-part of application No. 09/726,058, filed on Nov. 29, 2000, now Pat. No. 7,231,602.

(51) Int. Cl.
*G06F 17/00* (2006.01)
(52) U.S. Cl. .................. 715/269; 715/275; 345/426
(58) Field of Classification Search .......... 715/269–700
See application file for complete search history.

(56) References Cited

U.S. PATENT DOCUMENTS 4,881,197 A 11/1989 Fischer 5,263,132 A 11/1993 Parker
5,689,724 A 11/1997 Morgan et al. .............. 715/542

(Continued)

OTHER PUBLICATIONS

Borland, "Running Microsoft Word 97", Published by Microsoft Press, Redmond, Washington U.S.A. 1997 pp. 35-68, 447-451, and 826-842.*

(Continued)

*Primary Examiner*—Doug Hutton
*Assistant Examiner*—Quoc A Tran
(74) *Attorney, Agent, or Firm*—Workman Nydegger

(57) ABSTRACT

Reformatting a previously formatted document. A unique interface allows preview and selection of both a color set and a font set. A color set comprises a plurality of colors defining a color scheme. The font set comprises a plurality of fonts defining a font theme. A format set is defined by the selection of a color set and a font set. A format set comprises a plurality of formats, each format comprising a format font name, a format font size, a format font color, and other properties. Once a format set is determined, the document is reformatted in such a way as to largely maintain the proportionality and integrity of its previous formatting. In so doing, each discrete portion of text in the document is analyzed to determine its format properties. Each format in the format set is then compared to the text format. Points are added to a match quality value associated with the format when it is determined that a property of the format matches a property of the existing text format. The match quality values for each format in the format set are compared and the format having the greatest associated match quality value is applied to the discrete portion of text.

29 Claims, 6 Drawing Sheets

U.S. PATENT DOCUMENTS

| | | |
|---|---|---|
| 5,859,648 A | 1/1999 | Moore et al. .................. 345/471 |
| 5,864,850 A | 1/1999 | Nordman ...................... 707/10 |
| 5,877,776 A | 3/1999 | Beaman et al. ............. 345/472 |
| 5,990,907 A | 11/1999 | Colletti ....................... 345/467 |
| RE36,704 E * | 5/2000 | Parker et al. ................. 715/542 |
| 6,073,147 A | 6/2000 | Chan et al. ................... 715/542 |
| 6,323,865 B1 | 11/2001 | Colletti ....................... 345/467 |
| 6,330,577 B1 | 12/2001 | Kim ............................ 715/542 |
| 6,377,966 B1 | 4/2002 | Cooper et al. ................ 715/542 |
| 6,456,385 B1 | 9/2002 | Rolling et al. ............. 358/1.11 |
| 6,584,480 B1 | 6/2003 | Ferrel et al. ................. 715/513 |
| 6,675,358 B1 | 1/2004 | Kido ........................... 715/542 |
| 6,678,410 B1 | 1/2004 | Phinney |
| 6,687,879 B1 | 2/2004 | Teshima ..................... 715/542 |
| 2003/0023444 A1 | 1/2003 | St. John |

OTHER PUBLICATIONS

Bill Camarda "Special Edition Using Microsoft Word 2000", Published by Que, U.S.A. May 6, 1999 pp. 1-29.*
Russel Borland, "Running Microsoft Word 97", 1997, Published by Microsoft Press, pp. 35-68 and 826-842.

* cited by examiner

US 7,594,174 B2

LIVE PREVIEW AND SELECTION OF FONT AND COLOR SETS

RELATED APPLICATIONS

This application is a continuation of prior patent application Ser. No. 09/726,956, filed on Nov. 30, 2000 now U.S. Pat. No. 6,892,348, which itself is a continuation-in-part of prior application Ser. No. 09/726,058, filed on Nov. 29, 2000 now U.S. Pat. No. 7,231,602 the benefit of the filing dates of which is hereby claimed under 35 U.S.C. § 120.

TECHNICAL FIELD

The present invention relates to reformatting a document using a desktop word processing or publishing application program module. More particularly, the present invention relates to automatically reformatting each discrete portion of a document with a format from a format set that is determined to most closely match the existing format of the document.

BACKGROUND OF THE INVENTION

Desktop word processing and publishing application programs allow laymen users to create professional-looking documents and other output. Many prior art application programs provide tools that allow a user to custom format a document. For example, tools may be provided for selecting font face, font size, font color, text alignment, and other formatting options. Such tools are typically independent of one another, which forces the user to individually select and apply different formatting options until a desirable look for the document is discovered.

In order to tie some of the formatting options together, some application programs allow the user to define "styles." To define a style, the user is able to interact with various menus and controls in order to custom format a portion of text. The user may then name the custom format and cause the custom format name to appear in a "styles menu" or the like. Subsequent text may be selected and automatically formatted with the custom format by interacting with the styles menu. Style tools, however, tend to go undiscovered by the typical layman user. When discovered, style tools tend to be confusing to the typical user. In particular, many users have a difficult time modifying the style tags that they have created.

In addition to the difficulties encountered with formatting tools, laymen users generally lack the training and experience needed to create professional-looking documents from scratch. For example, laymen users are typically not trained to know which fonts look best in which sizes and in which color schemes. Also, many times laymen users do not know, in advance of creating a document, what formats they desire for the document. Laymen users are, however, able to compare several differently formatted documents to determine which style is most suitable to them.

Accordingly, some prior art application programs offer "templates," which provide the layman user with a constrained range of formatting choices, and thus well defined starting points for creating professional-looking documents. A template is a predefined format definition that is usually tied to a theme. For example, an application program may provide a birthday template for creating birthday cards or invitations, a garage sale template for creating garage sale signage, and the like. For the more creative layman user, templates tend to be too rigid and unyielding. While it may be possible to modify the format definitions within a template, it is often tedious and difficult to do so.

Thus, there remains a need for an application program to provide a simple and integrated tool for formatting a document according to a constrained range of formatting choices. There is a further need for simple and integrated tool for formatting a document according to a constrained range of formatting choices that is not tied to a predetermined theme.

SUMMARY OF THE INVENTION

The present invention satisfies the above described needs by providing a single integrated formatting tool, referred to as a format gallery. The format gallery provides a constrained range of formatting choices by way of formats within a format set. A format comprises a format font name, a format font size, a format font color, and other formatting options. A format set is defined by a color set and a font set. A color set comprises a plurality of colors defining a color scheme. The colors of the color scheme are pre-selected by a trained document designer. The font set comprises a plurality of fonts defining a font theme, each font having a font name and a font size. Again, the fonts of the font theme are predefined by a trained document designer based on their aesthetic appeal in relation to each other. The format gallery of the present invention allows the user to preview and select both a color set and a font set.

Once a format set is determined, the present invention employs a "fuzzy matching" method for reformatting the document. According to the fuzzy matching method, each discrete portion of text in the document is analyzed to determine a text font name, a text font, color and a text font size. Then, for each format in the format set, it is determined if the format font name matches the text font name. If the format font name does match the text font name, a first number of points is added to a match quality value associated with the format. Then it is determined if the format font color matches the text font color. If the format font color does match the text font color, a second number of points is added to the match quality value associated with the format. It is next determined if the format font size is greater than the text font size. If so, the ratio of the text font size to the format font size is multiplied by a third number to determine a first product and the first product is added to the match quality value. If the format font size is not greater than the text font size, the ratio of the format font size to the text font size is multiplied by the third number to determine a second product and the second product is added to the match quality value. For the rest of the applicable properties, the algorithm of the fuzzy matching method can be applied. That is, if a property matches that of the format, then a product is added to the quality match value for that format. When a final match quality value is determined for each format in the format set, the format having the greatest associated match quality value is applied to the discrete portion of text.

BRIEF DESCRIPTION OF THE DRAWINGS

FIG. 1, comprising

DETAILED DESCRIPTION OF THE EXEMPLARY EMBODIMENTS

Figure 1A:
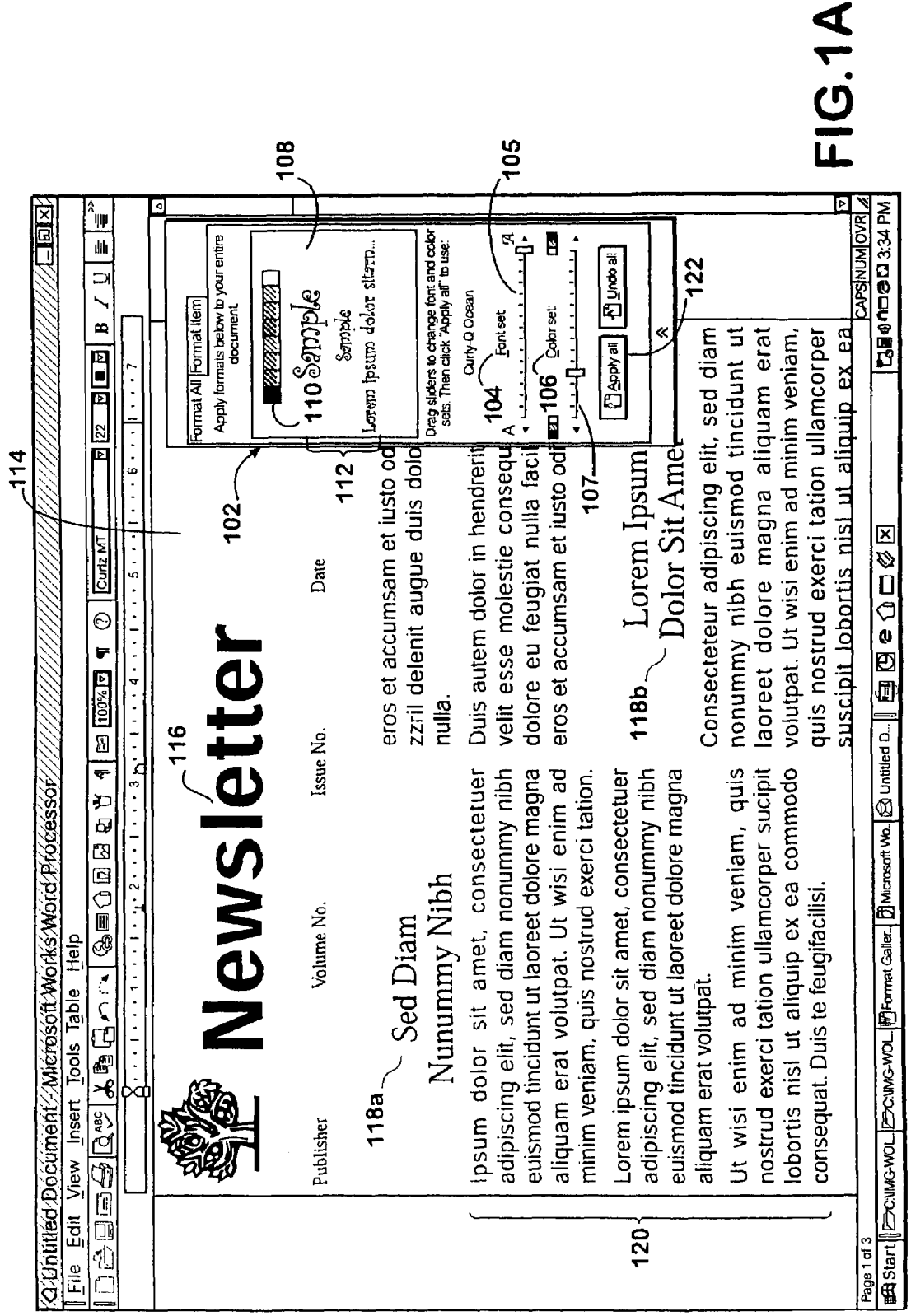
FIG. 1A and FIG. 1B, illustrates an exemplary interface of a word processing program module incorporating an exemplary integrated formatting tool of the present invention.

The inventive concept relates to a method and system for automatically reformatting a previously created document. It is assumed herein that all previously created documents are formatted with at least a default format. Thus, an act of formatting a previously created document may also be considered to be an act of reformatting the document. Accordingly, the term "reformat" and variations thereof may herein be used interchangeably with the term "format" and variations thereof.

Rather than providing templates having rigid design styles, the present invention provides a number of "format sets." A format set is made up of a number of formats. Each format is characterized by a font name (font face), font color, font size, etc. Formats are predetermined by a skilled document designer, who is trained to know which font faces work well in various color schemes and font sizes. In addition, the designer is trained to know what colors work well together in various types of documents.

According to the one aspect of the invention, a format set is defined by a font set and a color set. A font set comprises a number of fonts which tend to work well within a given theme. By way of illustration, a font set labeled "hefty" may include heavier fonts and other fonts that work well with the heavier fonts. The "hefty" font set may comprise various sizes of the font Rockwell Extra Bold and the font Lucida Sans. A color set comprises a number of colors that, in the trained opinion of the designer, may be used to create a document having a professional-looking color scheme. For example, a color set labeled "grape" may comprise several colors representing various shades and hues of the color purple. Thus, given a font set and a color set, a format set comprises a select combination of fonts, font sizes and colors.

One or more tools (user interfaces) may be provided for allowing the user to select from among a number of available font sets and color sets. In an exemplary embodiment, a single tool allows the user to select both a color set and a font set. Once the color set and font set are selected, the corresponding format set may be determined. As mentioned, a format set comprises a number of predefined formats (i.e., $format_N$, $format_{N+1}$, $format_{N+2}$, . . . ). Each format is predefined by a trained document designer based on aesthetic appeal. A sample of various formats included in the selected format set may be displayed to the user, so that the user can decide if the selected format set is desirable. Once the user decides on a format set, an input command may be entered to cause the selected format set to be applied to the document.

Application of the format set to the document is done in such a way that the integrity and proportionality of the document are maintained. For example, the document may include a title that is displayed in a first font face having a first size. The document may also include section headings that are displayed in a second font face having a second size. The body text of the document may be of a third font face and size. Accordingly, when the document is reformatted, the invention will attempt to maintain aesthetic differences between the font faces of the title, section headings, and body text, respectively. In addition, the invention will attempt to reformat the document so as to maintain a close approximation of the original proportionality between the title, section headings, and body text sizes, respectively.

Figure 1B:
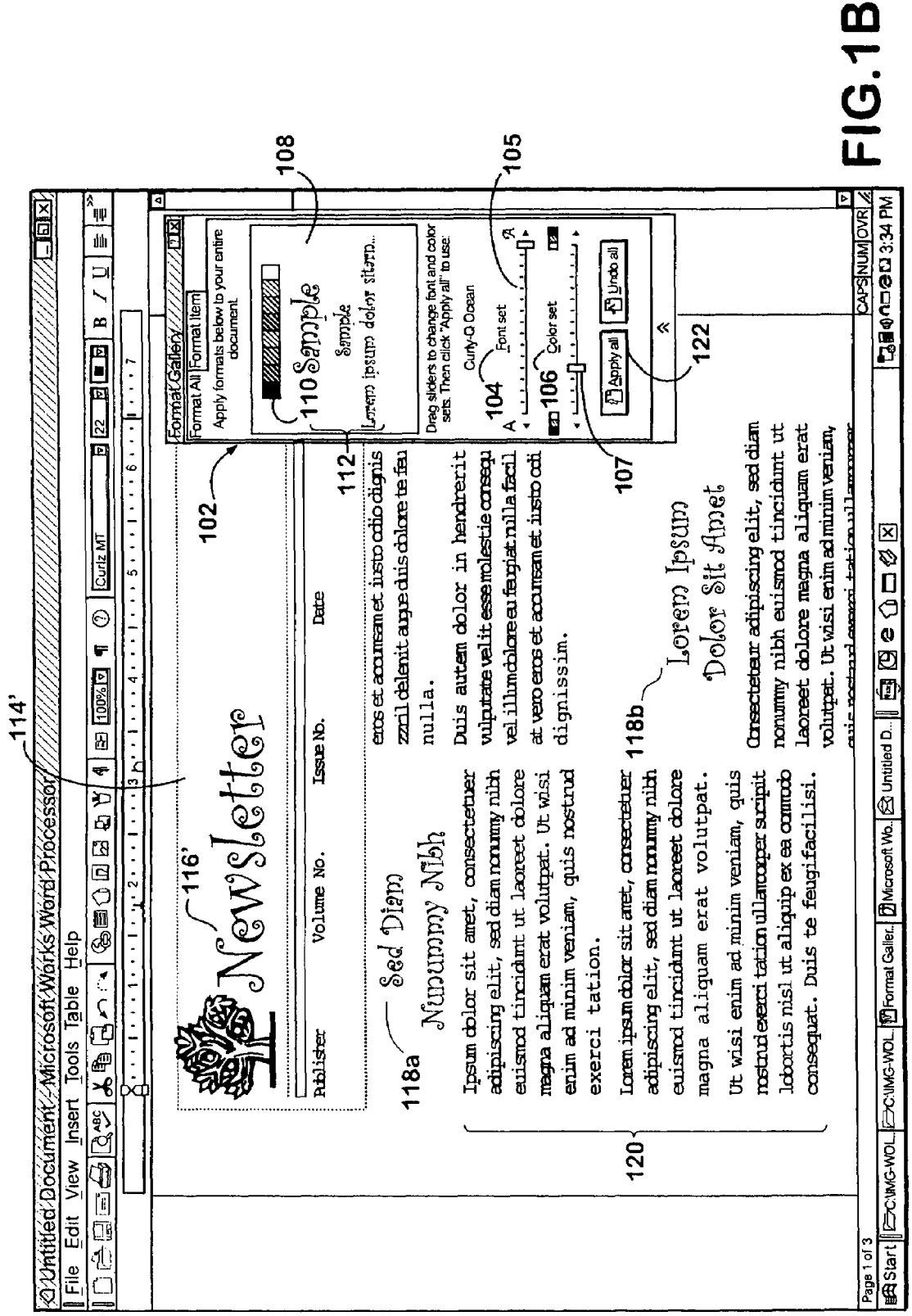

Exemplary embodiments of the present invention will hereinafter be described with reference to the drawings, in which like numerals represent like elements throughout the several figures. FIG. 1, comprising FIG. 1A and FIG. 1B, is a screen shot of the interface of a word processing program module that illustrates an exemplary integrated formatting tool of the present invention. The integrated formatting tool of the present invention is referred to herein as a "format gallery" 102. Referring first to FIG. 1A, the format gallery 102 is a single user interface that allows the user to select both a font set 104 and a color set 106. A sliding scale user interface control, referred to herein as a "font slider" 105, is provided in order to allow the user to browse through each of the available font sets. Similarly, a sliding scale user interface control, referred to herein as a "color slider" 107, is provided in order to allow the user to browse through all of the available color sets.

As mentioned, the selection of a font set 104 and a color set 106 determines the format set. The format gallery 102 may also include a preview window 108, which displays a color sample 110 and text sample 112 for the selected format set. The color sample 110 includes the various colors included in the selected color set 106. The text sample 112 includes several portions of text that are formatted in various sizes, colors and fonts according to the selected format set.

The format gallery 102 may be displayed as a floating window that hovers above the document 114 that is to be formatted or reformatted. The document 114 shown in FIG. 1A is a sample newsletter that has previously been formatted. As may be seen, the title 116 is displayed in a first font face and a first font size; the section headings 118a, b are displayed in the first font size and a second font size; and the body text 120 is displayed in a second font face and a third font size. Although not discernable from the figure, the title 116, section headings 118a, b, and body text 120 may each be displayed in a different color.

After a font set 104 and a color set 106 are selected via the format gallery 102 to define a format set, an input command may be generated to initiate the process of applying the selected format set to the document 114. The input command may be generated by way of an "Apply all" button 122, or similar control interface. According to one aspect of the invention, reformatting of the document 114 is performed in such a way as to maintain its integrity and proportionality. Reformatting is performed according to a method referred to herein as "fuzzy matching."

Prior to turning to FIG. 1B, assume that the document 114 of FIG. 1A has the following formats: the title 116 is displayed in a forty-eight point New Zurica font face having an orange color; the section headings 118a, b are each displayed in an eighteen point Times New Roman font face with a red color; and the body text 120 is displayed in a twelve point Arial font face having an automatic (black) color. Also note that the format gallery 102 indicates that the selected font set 104 is "Curly-Q" and the selected color set 106 is "Ocean." Thus, the selected format set is referred to as "Curly-Q Ocean." FIG. 1A thus portrays the state of the document 114 prior to activation of the "Apply all" button 122.

FIG. 1B shows the reformatted document 114' after the Curly-Q Ocean format set was selected and the "Apply all" button 122 was activated. The reformatted title 116' is now displayed in a forty-eight point Curlz MT font face having a midnight teal color; the reformatted section headings 118a', b' are each displayed in a twenty-two point Curlz MT font face with a green color; and the reformatted body text 120' is displayed in a twelve point Tempus Sands ITC font face having an automatic (black) color. Accordingly, the selected Curly-Q Ocean format set was applied to the document 114 in such a manner that the integrity and proportionality of the original formatting were largely maintained. In particular, the relative size differences between the title 116, the section headings 118a, b, and the body text 120 were closely maintained. Also, although the original colors of the title 116, and the section headings 118a, b were altered, color variations between the title 116, the section headings 118a, b, and the body text 120 were maintained within the predefined Ocean color scheme.

As mentioned, one aspect of the invention contemplates application of a format set according to a fuzzy matching method. According to the fuzzy matching method, a document 114 includes one or more originally formatted portions of text. The originally formatted portions of text are each analyzed to identify the original formatting thereof. Then, the original formatting of each portion of text is compared to each format included within the selected format set. The format of the format set that most closely matches the original formatting of each portion of text is applied to the corresponding portion of text. In order to determine whether an original formatting most closely matches a format within a format set, a weighted ranking or other appropriate logic operation may be employed. As an example of the fuzzy matching method, in reformatting the document 114 of FIG. 1, a determination may be made as to which of the formats included within the Curly-Q Ocean format set most closely matched the original format (New Zurica, forty-eight point, orange) of the title 116. Some of the predetermined formats included in the Curly-Q Ocean format set are: (Curlz MT, forty-eight point, midnight teal), (Curlz MT, twenty-six point, medium green), (Curlz MT, twenty-two point, green), (Curlz MT, fourteen point, midnight teal), (Curlz MT, seventeen point, green), (Tempus Sans ITC, twelve point, automatic), (Curlz MT, eleven point, midnight teal), (Tempus Sans ITC, ten point, automatic), (Tempus Sans ITC, ten point, medium green), (Tempus Sans ITC, ten point, turquoise) and (Tempus Sans ITC, nine point, green). It may be seen that none of the above-listed formats from the Curly-Q Ocean format set define a font color of orange or a font face of New Zurica and only one format defines a font size of forty-eight points. Thus, a weighting ranking based on matching font color, font face and font size may lead to the conclusion that the format (Curlz MT, forty-eight point, midnight teal) from the Curly-Q Ocean format set most closely matches the original format (New Zurica, forty-eight point, orange) of the title 116. Accordingly, the reformatted title 116' shown in FIG. 1B is displayed in a forty-eight point Curlz MT font having a color of midnight teal. Further details regarding exemplary embodiments of the fuzzy matching method will be described below.

Figure 2:
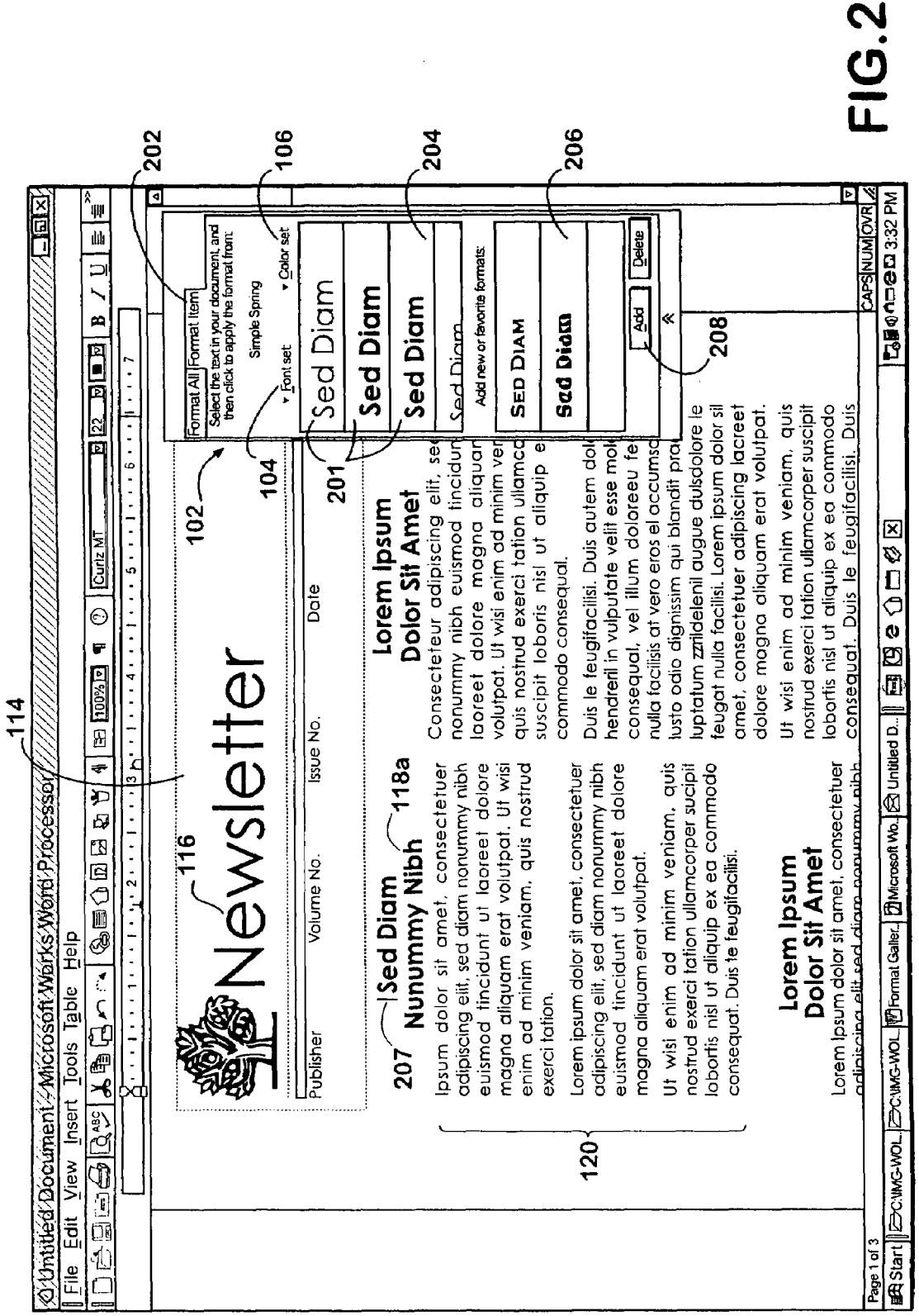
FIG. 2 illustrates an exemplary live preview interface of an exemplary integrated formatting tool of the present invention.

FIG. 2 is a screen shot of the interface of a word processing program module that illustrates an exemplary "live preview" aspect of the format gallery 102 of the present invention. The phrase "live preview" is used herein to describe a method of demonstrating the appearance of a portion of text formatted with several different formats. In one embodiment, live preview allows the user to view and compare a selected portion of text, referred to as the live preview text 201, in several formats at the same time. Thus, the user is able to visualize the appearance of the live preview text 201 in different formats, before actually selecting a format for reformatting the text in the document 114.

As shown in FIG. 2, a "format item" tab 202 or other appropriate interface control may be provided for the format gallery 102. Activation of the format item tab 202 triggers a second display of the format gallery 102. The second display of the format gallery 102 is geared toward reformatting an individual item (e.g., portion of text) in a document 114. The second display of the format gallery 102 thus differs in function from the first display, shown in and described with respect to FIG. 1, which is geared toward reformatting the entire document 114. The second display of the format gallery 102 includes a control, such as a pull-down menu, for selection of a font set 104. The second display of the format gallery 102 also includes a control, such as a pull-down menu, for selection of a color set 106. Furthermore, the second display of the format gallery 102 includes a live preview window 204 for displaying live preview text 201 in various formats from a format set defined by the selected color set 104 and the selected font set 106.

A format sample may be determined from the format set. A format sample comprises a number of formats from the format set. The live preview text will be displayed in the live preview window 204 in each of the formats from the format sample. As shown, the live preview text 201 comprising the words "Sed Diam" is displayed in several sample formats. A format sample may be used for live preview because the number of formats within an entire format set may be too large. The formats within the format sample may thus be representative formats from the format set that should provide the user with several aesthetically pleasing design choices. Accordingly, from a given format set, a different format sample may be chosen for live preview of title text 116 than would be chosen for live preview of body text 120. A format sample chosen for live preview of title text 116 may include heavier fonts, larger font sizes, and bolder font colors, for example.

In one embodiment, choice of the live preview text 201 may depend on whether the usr has selected any text within the document 114 for live preview. Thus, the document 114 may be scanned to determine whether the user has highlighted a portion of text, so as to indicate a desire to live preview the highlighted text. In another embodiment, the live preview text 201 may be considered to be the text positioned immediately adjacent to the cursor (even if no highlighting is detected). As demonstrated in FIG. 2, the first line of the section heading 118a "Sed Diam" is positioned immediately adjacent to the cursor 207 and is thus displayed as the live preview text 201. In any case, if no text within the document 114 can be identified for live preview, a default text string, such as the word "text" may be used as the live preview text 201. Depending on the size of the live preview window 204, the live preview text 201 may be constrained to a particular number of characters. In particular, if the cursor 207 is positioned at the start of the first sentence of the body text 120, it may be the case that only the first few words "Ipsum dolor sit" are used for live preview.

The second display of the format gallery 102 may also include a "custom format window" 206. By way of the custom format window 206, the user may be provided the opportunity to create a custom format to be added to the sample of formats and to the format set. By way of illustration, the user may interact with any of the formatting tools provided by the application program in order to apply a certain format to a portion of text. The user may then select the custom formatted portion of text, such as by highlighting or positioning the cursor in proximity thereto. Once selected, the custom formatted portion of text will be displayed as the live preview text 201 in the live preview window 204 (reformatted according to a sample of formats.) However, if the user activates an appropriate control, such as an "add" button 208, the custom formatted portion of text may be displayed (with the custom format) in the custom format window 206. The custom format may also be added to the sample of formats and to the format set. Thus, subsequent live preview text 201 will be displayed with the appropriate sample of formats in the live preview window 204 and with the custom format in the custom format window 206. Those skilled in the art will appreciate that the custom format window 206 may be implemented as a portion of the live preview window 204 or as its own separate window.

After the live preview text 201 is displayed in the live preview window 204 and/or the custom format window 206, the user may select one of the sample or custom formats, for example, by interacting with the desired portion of live preview text 201 with a pointing device. Selection of one of the sample or custom formats causes the corresponding text within the document 114 to be reformatted accordingly.

Figure 3:
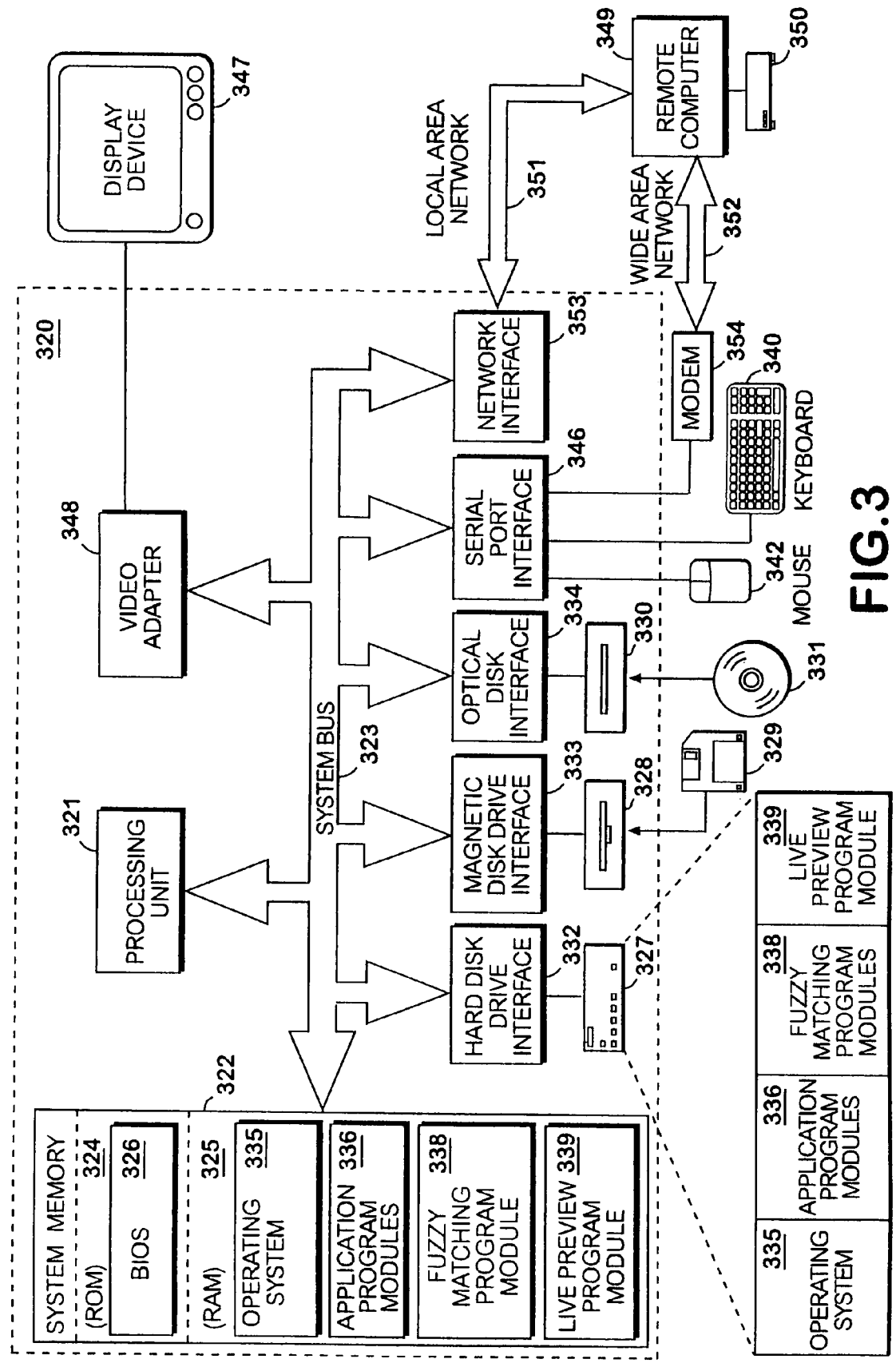
FIG. 3 is a functional block diagram of a computer system that may serve as an exemplary operating environment for implementation of the program modules of the present invention.

The exemplary embodiments of the present invention may be implemented by way of one or more program modules comprising computer-executable instructions for performing the methods of the present invention. Generally, program modules include routines, programs, components, data structures, etc. that perform particular tasks or implement particular abstract data types when executed by a computer system. FIG. 3 is a block diagram of a computer system that may serve as an exemplary operating environment for implementation of the program modules of the present invention. The exemplary operating environment includes a general-purpose computing device in the form of a conventional personal computer 320.

Generally, a personal computer 320 includes a processing unit 321, a system memory 322, and a system bus 323 that couples various system components including the system memory 322 to processing unit 321. System bus 323 may be any of several types of bus structures including a memory bus or memory controller, a peripheral bus, and a local bus using any of a variety of bus architectures. The system memory includes a read only memory (ROM) 324 and random access memory (RAM) 325. A basic input/output system (BIOS) 326, containing the basic routines that helps to transfer information between elements within personal computer 320, such as during start-up, is stored in ROM 324.

Personal computer 320 further includes a hard disk drive 327 for reading from and writing to a hard disk, not shown, a magnetic disk drive 328 for reading from or writing to a removable magnetic disk 329, and an optical disk drive 330 for reading from or writing to a removable optical disk 331 such as a CD-ROM or other optical media. Hard disk drive 327, magnetic disk drive 328, and optical disk drive 330 are connected to system bus 323 by a hard disk drive interface 332, a magnetic disk drive interface 333, and an optical disk drive interface 334, respectively. Although the exemplary environment described herein employs hard disk 327, removable magnetic disk 329, and removable optical disk 331, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 320. For example, one or more data files 360 (not shown ) may be stored in the RAM 325 and/or hard drive 327 of the personal computer 320.

A number of program modules may be stored on hard disk 327, magnetic disk 329, optical disk 331, ROM 324, or RAM 325, including an operating system 335, one or more application program modules 336, a fuzzy matching module 338, a live preview program module 339, and other program modules. The fuzzy matching module 338 and the live preview program module 339 of the present invention may be incorporated into or may otherwise be in communication with the application program module 336. Generally, a fuzzy matching module 338 includes computer-executable instructions for analyzing a target document to identify discrete portions of text and determining which formats of a selected format set are to be applied to each identified discrete portion of text. A live preview program module 339 generally comprises computer-executable instructions for applying a number of different formats from a format set to a sample of text and displaying the samples of formatted text.

A user may enter commands and information into personal computer 320 through input devices, such as a keyboard 340 and a pointing device 342. Other input devices (not shown) may include a microphone, joystick, game pad, satellite dish, scanner, or the like. These and other input devices are often connected to processing unit 321 through a serial port interface 346 that is coupled to the system bus 323, but may be connected by other interfaces, such as a parallel port, game port, a universal serial bus (USB), or the like. A display device 347 may also be connected to system bus 323 via an interface, such as a video adapter 348. In addition to the monitor, personal computers typically include other peripheral output devices (not shown), such as speakers and printers.

Personal computer 320 may operate in a networked environment using logical connections to one or more remote computers 349. Remote computer 349 may be another personal computer, a server, a client, a router, a network PC, a peer device, or other common network node. While a remote computer 349 typically includes many or all of the elements described above relative to personal computer 320, only a memory storage device 350 has been illustrated in the figure. The logical connections depicted in the figure include a local area network (LAN) 351 and a wide area network (WAN) 352. Such networking environments are commonplace in offices, enterprise-wide computer networks, intranets, and the Internet.

When used in a LAN networking environment, personal computer 320 is connected to local area network 351 through a network interface or adapter 353. When used in a WAN networking environment, personal computer 320 typically includes a modem 354 or other means for establishing communications over WAN 352, such as the Internet. Modem 354, which may be internal or external, is connected to system bus 323 via serial port interface 346. In a networked environment, program modules depicted relative to personal computer 320, or portions thereof, may be stored in the remote memory storage device 350. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 4:
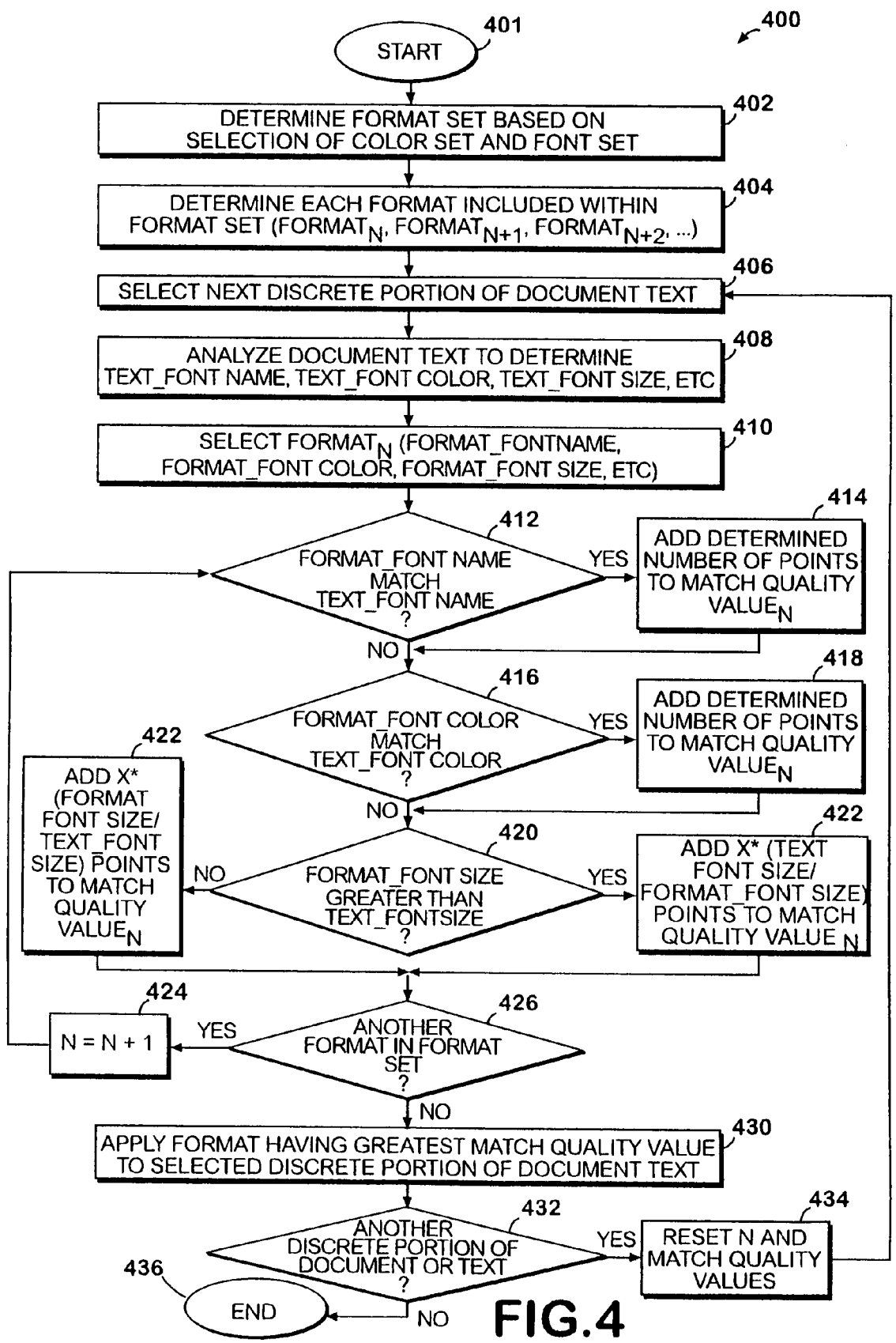
FIG. 4 is a flow chart illustrating an exemplary fuzzy matching method for reformatting a document in accordance with an embodiment of the present invention.

FIG. 4 is a flow chart illustrating an exemplary fuzzy matching method in accordance with one embodiment of the present invention. The exemplary method 400 begins at starting block 401, where an application program module, such as a word processing or desktop publishing program module, is executed by a computer system. From starting block 401, the method proceeds to step 402, where a format set is determined based on user selection of a color set and a font set. Next, the method 400 moves to step 404, where each format in the format set is determined. As previously mentioned, a format set may include a number of predefined formats (format$_n$, format$_{n-1}$, format$_{n+2}$, ... ). In an exemplary embodiment, a format defines a font face, a font size and a font color. Those skilled in the art will appreciate that a format may also define any other formatting option, such as font style (bold, italics, etc), text alignment, list styles (bullets, numbering, etc.), and the like.

At step 406, a document is scanned to identify and select the next (first) a discrete portion of text. As used herein, the term "discrete portion of text" is meant to describe a continuous portion of text having a consistent format applied thereto. A document may thus comprise one or more discrete portions of text. Thus, the text of a document may be scanned in order to locate transitions in formatting, which would signify a new discrete portion of text. Those skilled in the art will appreciate that there may be many alternate methods for scanning text to identify discrete portions thereof.

Next at step 408, the first discrete portion of document text is analyzed to determine its font name, font color, font size. Again, for the sake of simplification, this example discusses only font name, font color and font size, although other format properties may be utilized as well. At step 410, the first format in the format set is selected. For clarity, the format of the format set may be referred to herein in terms of format_font name, format_font color and format_font size, while the original format of the document text may be referred to herein in terms of text_font name, text_font color and text_font size.

At step 412, a determination is made as to whether the format_font name matches the text_font name. If the format_font name matches the text_font name, a determined number of "points" is added to a "match quality value" at step 414. A match quality value is a value that is recorded for each format of the format set and used for subsequent comparison purposes. Thus, a match quality value$_n$ is calculated for each format$_n$ of the format set. Match quality values are thus relative values, meaning that their starting values and number of points added to match quality values are discretionary. For example, each initial match quality value may be zero and five points may be added to the initial match quality value if the format_font name matches the text_font name.

If the format_font name does not match the text_font name at step 412, or after the appropriate number of points are added to the match quality value at step 414, the method proceeds to step 416, where a determination is made as to whether the format_font color matches the text_font color. If the format_font color matches the text_font color, another determined number of points is added to the match quality value at step 418. The determined number of points may be the same as or different from the number of points added for a font name match. Obviously a different number of points would be added for a font color match if it were desired to weight such a match differently.

If the format_font color does not match the text_font color at step 416, or after the appropriate number of points are added to the match quality value at step 418, the method proceeds to step 420, where a determination is made as to whether the format_font size is greater than the text_font size. If the format_font size is greater than the text_font size, the method moves to step 422. At step 422, the ratio of the text_font size to the format_font size is multiplied by a determined number X (e.g., X=30) and that number of points is added to the match quality value. Again, the determined number is discretionary based on the weight desired to be assigned to a font size match. If the format_font size is not greater than the text_font size the method proceeds to step 424. At step 424, the ratio of the format_font size to the text_font size is multiplied by the determined number X and that number of points is added to the match quality value. After the appropriate number of points are added to the match quality value at step 422 or step 424, the method proceeds to step 426.

The above-described weighting process is repeated for every format in the format set. Thus, at step 426, a determination is made as to whether there is another format in the format set. If so, n is incremented (n=n+1) at step 428 such that the next format and corresponding match quality value are selected. From step 428, the above-described method is repeated from step 412 until it is determined at step 426 that there is no other format in the format set. When it is determined that there is no other format in the format set, the method advances to step 430, where the format having the greatest match quality value is applied to the selected discrete portion of text in the document. Then at step 432, a determination is made as to whether there is another discrete portion of text in the document. If so, n is reset (n=1) at step 434 and the above-described method is repeated from step 406 until it is determined that there is not other discrete portion of document text at step 432. When it is determined that there is no other discrete portion of document text to be reformatted, the method ends at step 436. Therefore, by way of the above-described fuzzy matching method, each discrete portion of text in a document may be reformatted with a different format from the selected format set. As a result, the integrity and proportionality of the document should be largely preserved.

Figure 5:
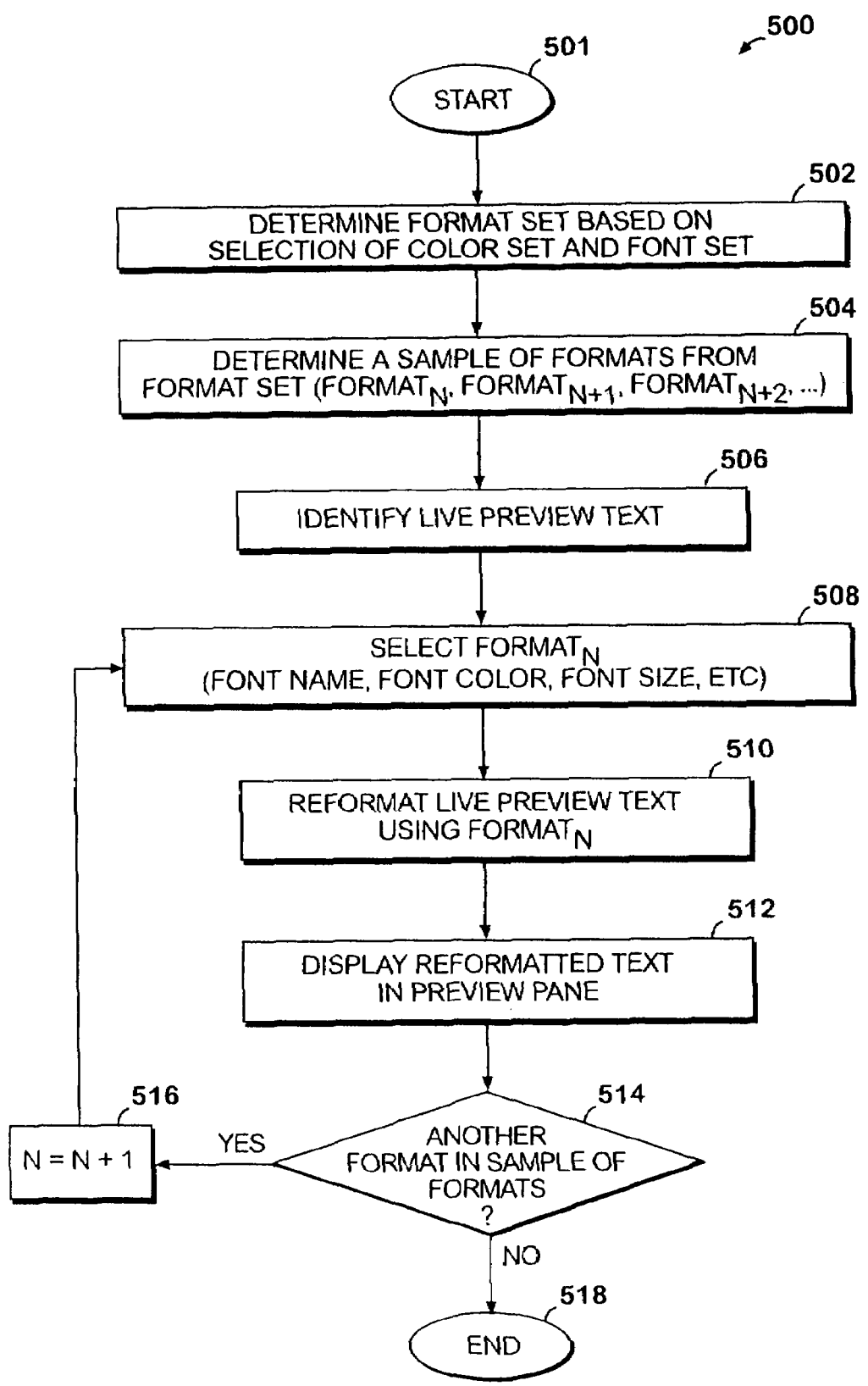
FIG. 5 is a flow chart illustrating an exemplary live preview method for reformatting document text in accordance with an embodiment of the present invention.

FIG. 5 is a flow chart illustrating an exemplary live preview method 500 in accordance with an exemplary embodiment of the present invention. The method 500 begins at starting block 501, where an application program module, such as a word processing or desktop publishing program module, is executed by a computer system. From starting block 501, the method 500 proceeds to step 502, where a format set is determined based on user selection of a color set and a font set. Next at step 504, a sample of formats is determined from the format set. A sample of formats comprises some or all of the formats in the format set. Thus, the sample of formats comprises format$_N$, format$_{N+1}$, format$_{N+2}$, . . . . A selected string of text will be displayed in each of the formats included within the sample of formats. As such, the sample of formats should include a enough representative formats to give the user a wide range of format choices within a format set At step 506, the live preview text is identified. In one embodiment, the document may be scanned in order to determine what text, if any, has been selected by the user for live preview. For example, it may be determined that the user has highlighted a portion of text indicating a desire to live preview the highlighted text. In another the text positioned immediately adjacent to the cursor may be considered to be the live preview text. In any case, if no live preview text can be identified, a default text string, such as the word "text" may be used as the live preview text. Depending on the size of the live preview pane, the live preview text may be constrained to a particular number of characters.

As mentioned, the live preview text will be displayed in each of the formats included within the sample of formats.

Thus, at step 508, the first format from the sample of formats is selected. As mentioned, a format may comprise many properties, such as font name, font color and font size. At step 510 the live preview text is reformatted with the selected sample and at step 512 the reformatted text is displayed in a preview pane. Then at step 514, a determination is made as to whether there is another format in the sample of formats. If another format exists, the next format is chosen (N=N+1) at step 516 and the method returns to step 508, where the second format from the sample of formats is selected. A step 510 the live preview text is reformatted with the selected format. The method is thus repeated from step 508 until it is determined at step 514 that no other formats exist within the sample of formats. It should be appreciated that display of the live preview text in each of the formats of the sample of formats may be accomplished in various ways, such as in a list or table. However, it is preferable to display all (or at least some) of the differently formatted text at the same time, so that the user may compare the different appearances.

In one embodiment, the user may be provided the opportunity to create a custom format to be added to the sample of formats and to the format set. For example, the user may apply a certain format to a portion of text and then select that portion of text as the live preview text. The user may then activate an "add" button or other suitable interface in order to cause the existing format of the live preview text to be added to the sample of formats and to the format set. Accordingly, subsequent live preview text will be displayed in the custom format as well as the other formats included in the sample of formats. Optionally, within the live preview pane, live preview text formatted with a custom format may be separated from live preview text formatted with standard formats. When it is determined that there are no other formats in the sample of formats, the method 500 ends at step 518.

The above description of exemplary embodiment of the present invention were provided by way of example only and not by way of limitation. Many elements of exemplary embodiments have been described using permissive language, such as "may" or should," meaning that such elements are optional and not mandatory. Unless an element has been described using clear mandatory language, such as "must" or "shall," it should be considered an optional element. From a reading of the foregoing, alternate embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

We claim:

1. In a computing system that provides desktop publishing capabilities, a method of utilizing a simple and integrated tool presenting a user with a plurality of formatting options for application of a user selected color set and a user selected font set to an electronic document displayed in a main window of a display connected to the computing system that provides desktop publishing capabilities, the method comprising:
   (a) displaying, to the user, a live preview interface window that is separate from a main window that displays an electronic document, the live preview window including each of:
      (i) a plurality of independently selectable color sets selectable through a color set sliding scale user interface control that allows the user to browse through all available color sets; and
      (ii) a plurality of independently selectable font sets selectable through a font set sliding scale user interface control that allows the user to browse through all available font sets, wherein each of the plurality of font sets are independent from each of the plurality of independently selectable color sets;
   (b) at the live preview interface window, receiving user selection of:
      (i) one of the plurality of color sets through the color set sliding scale user interface control, for prospectively changing the color of text in the electronic document, the selected one of the plurality of color sets including a plurality of different colors collectively defined as part of the same selected color set, the plurality of different colors corresponding to a plurality of different text elements; and
      (ii) one of the plurality of font sets through the font set sliding scale user interface control, independent of selection of one of the plurality of color sets, for prospectively changing the font used for text in the electronic document, the selected one of the plurality of font sets including a plurality of different font faces and sizes collectively defined as part of the same selected font set, the plurality of different font faces and sizes corresponding to the plurality of different text elements;
   (c) responding to the user selection of one of the plurality of color sets by displaying a sample of text to which the color set that was selected is applied, in the live preview interface window, and without applying the color set that was selected to the electronic document;
   (d) responding to the user selection of one of the plurality of font sets by displaying a sample of text to which the font set that was selected is applied, in the live preview interface window, and without applying the font set that was selected to the electronic document; and
   (e) after (c) and (d), receiving a single user input requesting application the plurality of colors of the selected color set and the plurality of fonts of the selected font set; and
   (f) in response to receiving the single user input, selectively and collectively applying a plurality of the colors of the color set and a plurality of the fonts of the font set to text of corresponding text elements in the electronic document such that the electronic document is collectively formatted to include the plurality of fonts of the font set and the plurality of colors of the color set that were independently selected by the user.

2. The method of claim 1, wherein selectively and collectively applying the plurality of colors and the plurality of fonts comprises, analyzing the entire electronic document and automatically determining that a plurality of different and discrete text elements are present and, in response to the single user input, applying a different color and font combination to each different text element, wherein each applied different color is included in the selected color set and each applied different font is in the selected font set.

3. The method of claim 2, wherein analyzing the entire electronic document and automatically determining that a plurality of different and discrete text elements are present comprises applying a fuzzy matching algorithm to the document.

4. In a computing system that provides desktop publishing capabilities, a method of utilizing a simple and integrated tool to enable a user to electronically peruse a plurality of independently selectable color sets and a plurality of independently selectable font sets in preparation for application by the user to an electronic document that is displayed in a main window of a display connected to the computing system that provides desktop publishing capabilities, the method comprising:

(a) selecting a color set from the plurality of independently selectable color sets displayed in a live preview interface window, wherein selection occurs through use of a color set sliding scale user interface control that allows the user to slide the control to browse through all available color sets, and wherein the live preview interface window is separate from a main window that displays an electronic document and the selected color set includes multiple different colors collectively defined as part of the same selected color set and corresponding to different text styles, so that selection of the color set using the color set sliding scale user interface control collectively applies the multiple different colors to a sample of text in the live preview interface window, but not yet to the electronic document;

(b) independent of selection of the color set, selecting a font set from the plurality of independently selectable font sets displayed in the same live preview interface window, wherein selection of the font set occurs through use of a font set sliding scale user interface control that allows the user to slide the control to browse through all available font sets, and wherein the selected font set includes multiple different font faces and sizes collectively defined as part of the same selected font set and corresponding to the different text styles, so that selection of the font set through the font set sliding scale user interface control applies the multiple different font faces and sizes to the sample of text displayed in the live preview interface window, but not yet to the electronic document;

(c) enabling a user to peruse a combination of the color set and the font set selected and applied to the sample of text in the live preview interface window; and (d) receiving from the user an indication that the user is satisfied with the combination of the color set and the font set selected and applied to the sample of text in the live preview interface window and only thereafter applying the combination to the electronic document such that in response to a single user input indicating satisfaction with the combination of the color set and the font set, the text of the electronic document is collectively formatted to include the multiple fonts of the selected font set and the multiple colors of the selected color set as selected by the user.

5. The method of claim 4, wherein the step of selecting the color set comprises the step of positioning a color set designator in a visual display so as to indicate the color set selected from the plurality of color sets.

6. The method of claim 5, wherein the color set selected is apparent to the user by viewing the visual display in the live preview interface window.

7. The method of claim 6, wherein the visual display comprises one of:
   (a) a representative sample of the colors comprising the color set that was selected or
   (b) the name of the color set that was selected.

8. The method of claim 4, wherein the step of selecting the font set further comprises the step of positioning a font set designator so as to indicate the font set that was selected from the plurality of font sets in a visual display.

9. The method of claim 8, wherein the font set selected is apparent to the user by viewing the live preview window.

10. The method of claim 9, wherein the visual display comprises one of:

(a) a sample of a portion of the document, showing how the portion of the document will appear if the font set selected is applied to the document; or
(b) the name of the font set that was selected.

11. The method of claim 4, wherein the color set selected is a first color set and the font set selected is a first font set, and wherein before the step of receiving from the user an indication that the user is satisfied with the combination of the color set and the font set, the method includes: selecting a second color set in response to the user repositioning a color set designator so as to indicate a different color set selected, and wherein selectively applying the color set to the electronic document comprises selectively applying the second color set to the electronic document.

12. The method of claim 4, wherein the font set selected is a first font set, and wherein before the step of receiving from the user an indication that the user is satisfied with the combination of the color set and the font set, the method includes selecting a second font set in response to the user repositioning a font set designator so as to indicate a different font set selected, and wherein selectively applying the font set to the electronic document comprises selectively applying the second font set to the electronic document.

13. The method of claim 4, wherein the different text styles corresponding to the multiple colors include at least: a title, a section heading, and a body, and wherein a different color and font is selected and collectively applied to text making up the title, section heading, and body.

14. The method of claim 4, wherein each of the plurality of font sets comprises:
   (a) a font name for each of the plurality of fonts in the font scheme; and
   (b) a font size.

15. The method of claim 4, wherein the plurality of color sets is independent of the plurality of font sets, so that selection of a color set does not require selection of a specific font set, and so that selection of a font set does not require selection of a specific color set.

16. A memory medium having machine executable instructions for carrying out the steps of claim 4.

17. A computing system that enables a user to be presented with at least one of a plurality of different, independently selectable color sets and a plurality of different, independently selectable font sets, in preparation for application by the user of at least one of a user selected color set and a user selected font set to an electronic document displayed in a main window, comprising:

(a) a display;
(b) a processor coupled to the display; and
(c) a physical machine-readable storage medium accessible to the processor, the machine-readable storage medium storing machine executable instructions that when executed by the processor, cause the system to:
   (i) display, to the user, a single, live preview user interface window that is separate from a main window that displaces an electronic document, the live preview user interface window enabling the user to select each of:
      (1) a color set from a plurality of available, independently selectable color sets selectable through a color set sliding scale user interface control that allows the user to browse through all available color sets in the live preview user interface window, each of the plurality of independently selectable color sets including a plurality of different colors collectively defined as part of the same color set, the plurality of different colors of the plurality of color sets being pre-selected by a designer; and (2) a font set from a plurality of available, independently selectable font sets selectable through a font set sliding scale user interface control that allows the user to browse through all available font sets in the live preview user interface window, each of the plurality of font sets including a plurality of different font faces and sizes, the plurality of different font faces and sizes of the plurality of font sets being collectively defined as part of the same selected font set and pre-selected by a designer, wherein the plurality of available font sets are each selectable independent of the plurality of available color sets;

(ii) in response to user selection of the color set from the plurality of independently selectable color sets through the color set sliding scale user interface control in the live preview interface, display a color sample of the plurality of different colors of only the selected color set, and apply the selected color set to a sample of text selected from the electronic document and displayed in the live preview user interface window so that the plurality of different colors of the color set are collectively applied to, and simultaneously displayed using, the sample of text, and without applying the selected color set to the electronic document, such that the sample of text in the live preview interface window includes the plurality of different colors;

(iii) in response to user selection of the font set from the plurality of independently selectable font sets through the font set sliding scale user interface control in the live preview interface, apply the selected font set to the selected sample of text from the electronic document that is displayed in the live preview user interface window so that the plurality of different font faces and sizes are collectively applied to, and simultaneously displayed using, the sample of text, and without applying the selected font set to the electronic document, such that the sample of text in the live preview interface window includes the plurality of different font faces;

(iv) enable a user to peruse the selected color set and the selected font set selected in the live preview interface window;

(v) receive from the user a single indication that the user is satisfied with the combination of the color set and the font set selected and applied to the sample of text in the live preview interface window, and only thereafter collectively apply the plurality of font faces and plurality of colors of the selected font set and color set to the entire electronic document such that all text elements of the entire electronic document are formatted to include corresponding ones of both the plurality of different font faces of the selected font set and the plurality of different colors of the selected color set as selected by the user; and (vi) evaluate differences in font sizes between various text elements of the document and, after receipt of the single indication from the user and collectively with the application of the selected font set and color set, change font sizes of the various text elements to maintain approximately a proportionality between differing font sizes of the text elements of electronic document as measured before application of the selected font set and color set.

18. The system of claim 17, wherein the machine-readable storage medium further stores machine-executable instructions that when executed by the processor, cause the system to position a color set designator so as to indicate the color set selected from the plurality of color sets, in a visual display.

19. The system of claim 18, wherein the color set selected is apparent to a user by viewing the visual display in the live preview interface window.

20. The system of claim 19, wherein the visual display comprises one of:
(a) a representative sample of the colors comprising the color set that was selected; or
(b) the name of the color set that was selected.

21. The system of claim 17, wherein the machine-readable storage medium further stores machine-executable instructions that when executed by the processor, cause the system to position a font set designator so as to indicate the font set that was selected from the plurality of font sets in a visual display.

22. The system of claim 21, wherein the font set selected is apparent to a user by viewing the visual display in the live preview window.

23. The system of claim 22, wherein the visual display comprises one of:
(a) a sample of a portion of the document, showing how the portion of the document will appear if the font set selected is applied to the document; or
(b) the name of the font set that was selected.

24. The system of claim 17, wherein the machine-readable storage medium further stores machine-executable instructions that when executed by the processor, cause the system to reposition the color set designator so as to indicate any different color set selected.

25. The system of claim 17, wherein the machine-readable storage medium further stores machine-executable instructions that when executed by the processor, cause the system to reposition the font set designator so as to indicate any different font set selected.

26. The system of claim 17, wherein the color set comprises a plurality of colors pre-selected by a professional designer to result in a color scheme, the plurality of colors in the color scheme being selected based on an aesthetic appeal of the color set.

27. The system of claim 17, wherein each of the plurality of font sets comprises a plurality of font faces pre-selected by a professional designer to result in a font scheme, the plurality of font faces in the font scheme being selected based on an aesthetic appeal of the font set.

28. The system of claim 27, wherein each of the plurality of font sets comprises:
(a) a font name for each of the plurality of fonts; and
(b) a font size.

29. The system of claim 17, wherein the plurality of color sets is independent of the plurality of font sets, so that selection of a color set does not require selection of a specific font set, and so that selection of a font set does not require selection of a specific color set.

* * * * *